US008917835B2

(12) United States Patent
Shaw (10) Patent No.: US 8,917,835 B2
(45) Date of Patent: *Dec. 23, 2014

(54) VISUAL VOICEMAIL PRIVACY PROTECTION

(71) Applicant: AT&T Mobility II LLC, Atlanta, GA (US)

(72) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/679,354

(22) Filed: Nov. 16, 2012

(65) Prior Publication Data
US 2013/0070913 A1 Mar. 21, 2013

Related U.S. Application Data

(63) Continuation of application No. 13/592,534, filed on Aug. 23, 2012, now Pat. No. 8,351,905, which is a continuation of application No. 12/638,226, filed on Dec. 15, 2009, now Pat. No. 8,265,602.

(51) Int. Cl.
| H04M 1/64 | (2006.01) |
| H04M 3/42 | (2006.01) |
| H04M 3/533 | (2006.01) |
| H04M 1/65 | (2006.01) |

(52) U.S. Cl.
CPC .......... *H04M 1/65* (2013.01); *H04M 2203/253* (2013.01); *H04M 3/42153* (2013.01); *H04M 3/53333* (2013.01); *H04M 2203/6009* (2013.01)
USPC ............... 379/88.22; 379/88.18; 455/411; 455/413; 455/414.2; 709/217

(58) Field of Classification Search
CPC ............ H04M 3/533; H04M 3/53333; H04M 3/42059
USPC .............. 379/88.18, 88.22, 88.23; 455/413, 455/414.2, 411; 709/217
See application file for complete search history.

(56) References Cited

U.S. PATENT DOCUMENTS

| 8,155,282 B2 * | 4/2012 | Thaper et al. ............. 379/88.18 |
| 8,265,602 B2 | 9/2012 | Shaw |
| 8,351,905 B1 | 1/2013 | Shaw |
| 2007/0055785 A1 * | 3/2007 | Stevens ......................... 709/229 |
| 2007/0127662 A1 * | 6/2007 | Morehead ..................... 379/198 |
| 2009/0041211 A1 * | 2/2009 | Bolden et al. ............. 379/88.12 |
| 2010/0025588 A1 * | 2/2010 | Trupke et al. ................ 250/362 |
| 2010/0035588 A1 | 2/2010 | Adler et al. |
| 2010/0056113 A1 * | 3/2010 | Silverman .................... 455/413 |
| 2010/0279663 A1 * | 11/2010 | Wang et al. .................. 455/413 |
| 2010/0332635 A1 * | 12/2010 | Rogel et al. .................. 709/223 |
| 2011/0047288 A1 | 2/2011 | Sakano |

* cited by examiner

*Primary Examiner* — Simon King
(74) *Attorney, Agent, or Firm* — Baker & Hostetler LLP (57) ABSTRACT

Visual voicemail privacy protection is implemented by requiring a credential from a user or a user device before providing voicemail data to the user. The credential may be a user name and password combination, a digital certificate, or the like. The user may enable or disable this privacy protection feature at will. A first device being used for visual voicemail services may detect a second device within a defined area around the first device and either enable or disable privacy protection features based on whether the second device is determined to be an authorized or unauthorized device. Privacy protection features may be implemented locally or remotely.

20 Claims, 8 Drawing Sheets

VISUAL VOICEMAIL PRIVACY PROTECTION

CROSS REFERENCE TO RELATED APPLICATIONS

This application is a continuation of, and claims priority to, U.S. patent application Ser. No. 13/592,534, filed Aug. 23, 2012, which is a continuation of U.S. patent application Ser. No. 12/638,226, filed Dec. 15, 2009, which is now U.S. Pat. No. 8,265,602, issued on Sep. 11, 2012, entitled "Visual Voicemail Privacy Protection," the entire contents of which are hereby incorporated herein by reference.

TECHNICAL FIELD

The technical field generally relates to wireless communications and more specifically relates to protecting user privacy in visual voicemail systems.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities that allow the device to process multimedia content, the ability to communicate with data networks such as the Internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. Traditionally, a user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to view attributes of voicemail and manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server. Visual voicemail systems may also provide a means for a sender to include multimedia content to accompany a voice message or to be provided instead of a voice message.

Current visual voicemail services are typically implemented with a single device associated with a single user or user account. In current implementations, visual voicemail data is only transmitted to a single user device and only that device is able to transmit user data to the voicemail system. This provides some measure of security because voicemail access is not available from more than one device. However, current implementations prevent users from accessing visual voicemail systems and data from more than one device, which reduces the convenience of a voicemail system. If the option were presented to a user to access visual voicemail systems and data from multiple devices, current visual voicemail implementations do not provide the security that would be needed to ensure the privacy of voicemail data that may be accessed from several devices, some of which may be used by users other than the voicemail account owner. What are needed in the art are systems, devices, and methods of protecting user privacy in visual voicemail systems.

SUMMARY

Systems and method are disclosed for providing visual voicemail privacy protection. A credential may be required from a user or a user device before providing voicemail data to the user. The credential may be a user name and password combination, a digital certificate, or the like. The credential may be evaluated on a voicemail server or on the user device. If the credential is not properly verified, an error message may be presented to the user. If the credential is properly verified, a visual voicemail client may then be permitted to exchange voicemail data with a voicemail server. The user may enable or disable this privacy protection feature at will.

In some embodiments, a device executing a visual voicemail client may detect another device within a defined area around the device executing the visual voicemail client. Alternatively, a voicemail server may detect a device in proximity to a visual voicemail client-enabled device. Responsive to this detecting, visual voicemail features may be enables or disabled based on whether the detected device is determined to be an authorized or unauthorized device. Once a visual voicemail communications session is in place between a visual voicemail client and a voicemail server, and an unauthorized device is detected in proximity to the device that is executing the visual voicemail client, previously disable privacy protection features may be enabled. Privacy protection features may be implemented locally on a visual voicemail client, remotely on a voicemail server, or using a combination of the two. These and additional aspects of the current disclosure are set forth in more detail below.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
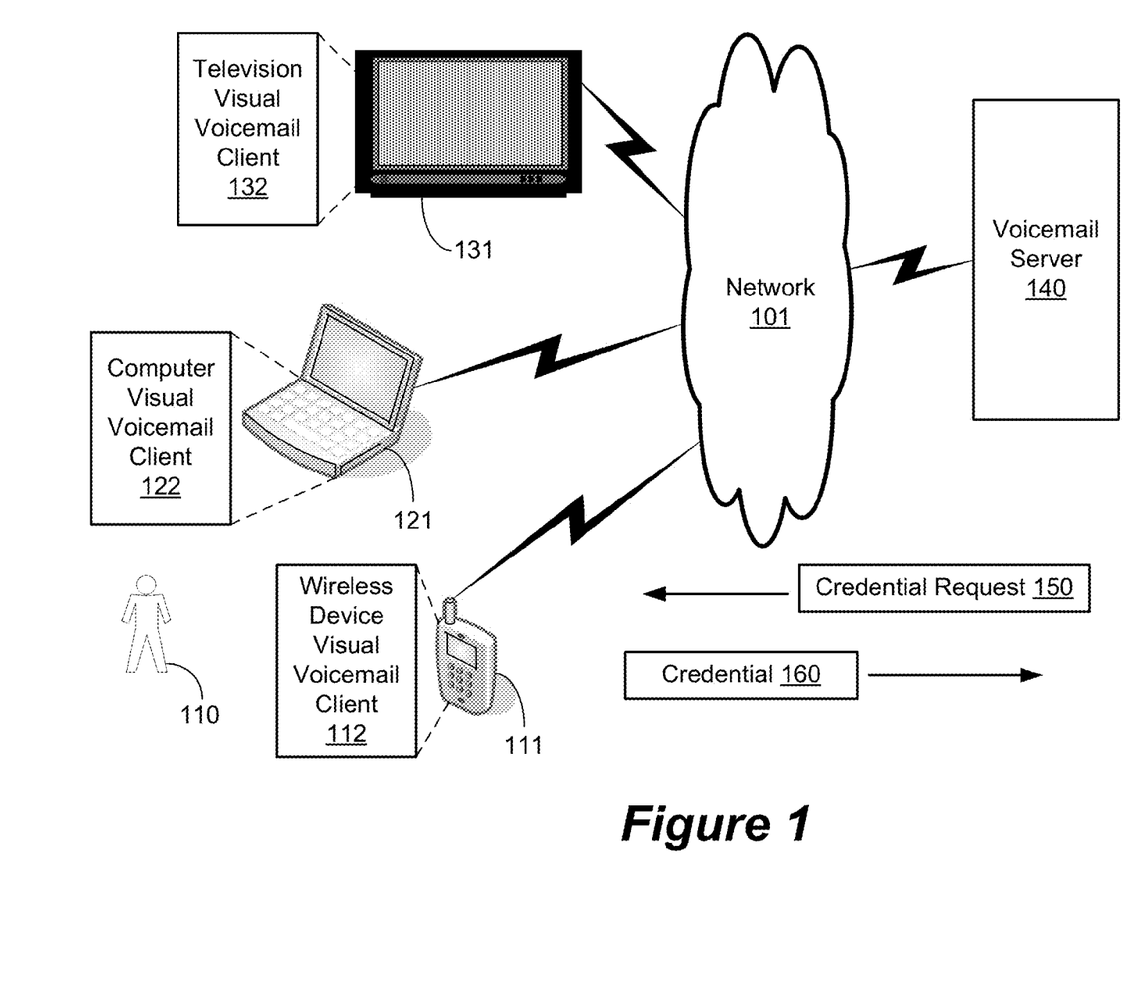
FIG. 1 illustrates a non-limiting exemplary network environment in which visual voicemail privacy protection methods and systems may be implemented.

FIG. 1 illustrates a network environment in which one or more embodiments of the disclosed systems and methods for protecting user privacy in visual voicemail systems may be implemented. User 110 may operate any of wireless device 111, computer 121, and television 131. Wireless device 111 may be any type of wireless mobile communications device, including a mobile telephone, smart phone, personal data assistant (PDA), mobile computer, wireless email device, or any combination thereof. Alternatively, while wireless device 211 as illustrated represents wireless mobile communications devices, wireless device 211 may also represent a wired device, such as a landline telephone, computer, email device, or any other communications device or any combination thereof. Computer 121 may be a laptop computer, a desktop computer, a mobile computer, or any computing device of any type, and may be configured with any operating system, software, hardware and peripheral devices. Television 131 may be any type of video presentation device that may be configured to connect to a data communications network using and communication means, including wired and wireless communications. All such embodiments are contemplated as within the scope of the present disclosure.

Each of wireless device 111, computer 121, and television 131 may be configured to communicate with network 101. Network 201 may be any type of network capable of providing wireless and/or wired data and/or voice communications services to devices of any type. Network 101 represents any number of interconnected networks that may be composed of any number and type of wired and/or wireless network devices. Network 101 may enable devices 111, 121, and 131 to communicate with other devices accessible via network 101, including voicemail server 140, web servers, and mobile communications devices such as cell phones and mobile computing devices. Such communication may be voice, data, or a combination thereof. All such embodiments are contemplated as within the scope of the present disclosure.

In one embodiment, each of devices 111, 121, and 131 may be configured to access and/or communication with visual voicemail server 140 via network 101. User 110 may operate each of devices 111, 121, and 131 to access his or her voicemail data using the corresponding wireless device visual voicemail client 112, computer visual voicemail client 122, and television visual voicemail client 132. Clients 112, 122, and 132 may be similar or identical software, hardware, or combinations thereof. Alternatively, clients 112, 122, and 132 may be customized for specific applications. For example, wireless device visual voicemail client 112 may be specifically designed or configured for use on mobile telephones or similar devices, computer visual voicemail client 122 may be specifically designed or configured for use on laptop and desktop computers, and television visual voicemail client 132 may be specifically designed or configured for use on televisions or associated devices, such as set top boxes or converter boxes. In yet another alternative, there may be only a single client or user interface that a user may interact with regardless of the end user device that the user is operating. For example, visual voicemail client functionality may be provided by a web server and accessed by a user through a web browser. In such an embodiment, each of devices 111, 121, and 131 may access such a web server using a web browser configured on each device. Any other permutation or combination of these embodiments, and any embodiments which provide similar functionality, are contemplated as within the scope of the present disclosure.

Because multiple users may access each of devices 111, 121, and 131, it may be beneficial to provide access control for user's 110 voicemail account. Accordingly, in one embodiment, voicemail server 140 may require a credential or other user validation. For example, in one embodiment, when user 110 operates device 111, 121, or 131 to access voicemail server 140, voicemail server 140 may transmit credential request 150 to the device that user 110 is operating. Credential request 150 may be a request for a user name and password. Credential request 150 may operate in conjunction with the visual voicemail client installed on the device operated by the user, such as client 112, 122, or 132 in order to present an interface that allows the user to provide the requested information. Alternatively, credential request 150 may be presented to the user through a web browser or other interface that allows user 110 to provide a user name and password. In other embodiments, all of which are contemplated, rather than a user name and password, other data may be requested of a user by credential request 150, such as a telephone number, an international mobile subscriber identity (IMSI), or any other identifying data. Any such data may have one or more corresponding passwords that may be required of the user before access to voicemail data is permitted. Upon receiving the requested credential from a user, the corresponding visual voicemail client may transmit credential 160 to voicemail server 140.

Note that rather than voicemail server 140 transmitting a request for a credential to a device and/or visual voicemail client, each visual voicemail client 121 may be configured to locally require a credential. For example, computer visual voicemail client 122 may be configured to require a user name and password before communicating with voicemail server 140. Computer visual voicemail client 122 may locally store, in one embodiment in encrypted form, a user name and password, and may check a user-provided user name and password against the stored user name and password before allowing the user access to the functions of computer visual voicemail client 122. In some embodiments, the stored user name and password may be obtained from an external device, such as voicemail server 140, while in other embodiments, user 110 may have manually configured the stored user name and password, for example as part of computer visual voicemail client 122 settings.

In another embodiment, rather than a user name and password, or in addition to a user name and password, voicemail server 140 may request via credential request 150 a certificate, key, or other data from the device and/or user. For example, when user 110 operates television 131 to access user's 110 voicemail account, voicemail server 140 may transmit credential request 150 requesting a certificate to television visual voicemail client 132. Responsive to receiving credential request 150, television visual voicemail client 132 may locate and transmit a copy of a certificate stored on television 131 to voicemail server 140. This may be done automatically, without interaction with user 110, or it may require some input from user 110. In other embodiments, public/private key pairs may be used, or any other method or means of validating or authenticating the identity or rights of a user before allowing access to voicemail data may be employed, and all such embodiments are contemplated. Upon locating or otherwise obtaining the requested credential, television visual voicemail client 132 may transmit credential 160 to voicemail server 140. Note that similar functions may be performed by any of clients 112 and 122, or any visual voicemail client configured on any device. Alternatively, any other components of a device, such as the operating system, may perform these credential functions with or without interacting with a visual voicemail client. All such embodiments are contemplated as within the scope of the present disclosure.

Upon receiving credential 160, voicemail server 140 may then evaluate credential 160 and determine if the credential satisfies the privacy protection requirements configures on voicemail server 140. This may be as simple as verifying that a user name and password provided in credential 160 matches those associated with the voicemail account, or verifying that a certificate provided in credential 160 matches the certificate associated with the voicemail account. Alternatively, and also contemplated as within the scope of this disclosure, key checking may be performed, or any other process or means of validating and/or authenticating a credential or other data may be implemented. If credential 160 is successfully validated, voicemail data may be exchanged between the device operated by user 110 and voicemail server 140. If voicemail server 140 is not able to validate credential 160, voicemail server 140 may transmit an error message or other response to the device operated by user 110, or otherwise provide an indication that credential 160 does not satisfy the security criteria of voicemail server 140.

Note that for each of devices 111, 121, and 131, user 110 may configure the respective visual voicemail client to enable or disable any of the privacy protection means described herein. For example, if user 110 feels that there is no risk of an unauthorized user accessing user's 110 wireless device 111, user 110 may configure wireless device visual voicemail client 112 to not require privacy protection. This may be accomplished in several ways. In an embodiment where a credential is required by voicemail server 140, wireless device visual voicemail client 112 may be configured to automatically provide the credential to voicemail server 140 upon activation of wireless device visual voicemail client 112. Alternatively, voicemail server 140 may record which devices or clients are authorized to access the voicemail data associated with user 110, and/or which devices clients are configured to require credentials. For those devices that do not require credentials, such as wireless device 111 in this example, no credential request 150 may be transmitted to wireless device 111, and no credential request 150 may be required before voicemail data is exchanged between wireless device visual voicemail client 112 and/or wireless device 111 and voicemail server 140.

In another example, user 110 may feel that computer 121 has some risk of unauthorized users accessing it, and may therefore configure computer 121 and/or computer visual voicemail client 122 to require any of the privacy protection measures disclosed herein. Here again, this may be configured locally at computer visual voicemail client 122 or remotely at voicemail server 140, or any combination thereof. In another embodiment, user 110 may feel that television 131 has a high risk of unauthorized use, and may configure television 131 and/or television visual voicemail client 132 to not allow access to voicemail data associated with user 110. This configuration may also be configured locally at computer visual voicemail client 122 or remotely at voicemail server 140, or any combination thereof. Accordingly, voicemail server 140 may refuse to exchange voicemail data with television 131 and/or television visual voicemail client 132, or television visual voicemail client 132 may be configured to not provide any functionality to a user of television 131.

Note that the configuration of privacy protections on a device or client may also be protected using means described herein. For example, a credential, such as a user name and password, may be required before access to settings in any of clients 112, 122, and 132 that allow a user to enable or disable privacy protection settings. The same credential may be used for access to privacy protection setting as is used for access to voicemail data, or a separate credential may be used for each purpose. Any combinations or variations of these are contemplated as embodiments of the present disclosure.

Figure 2:
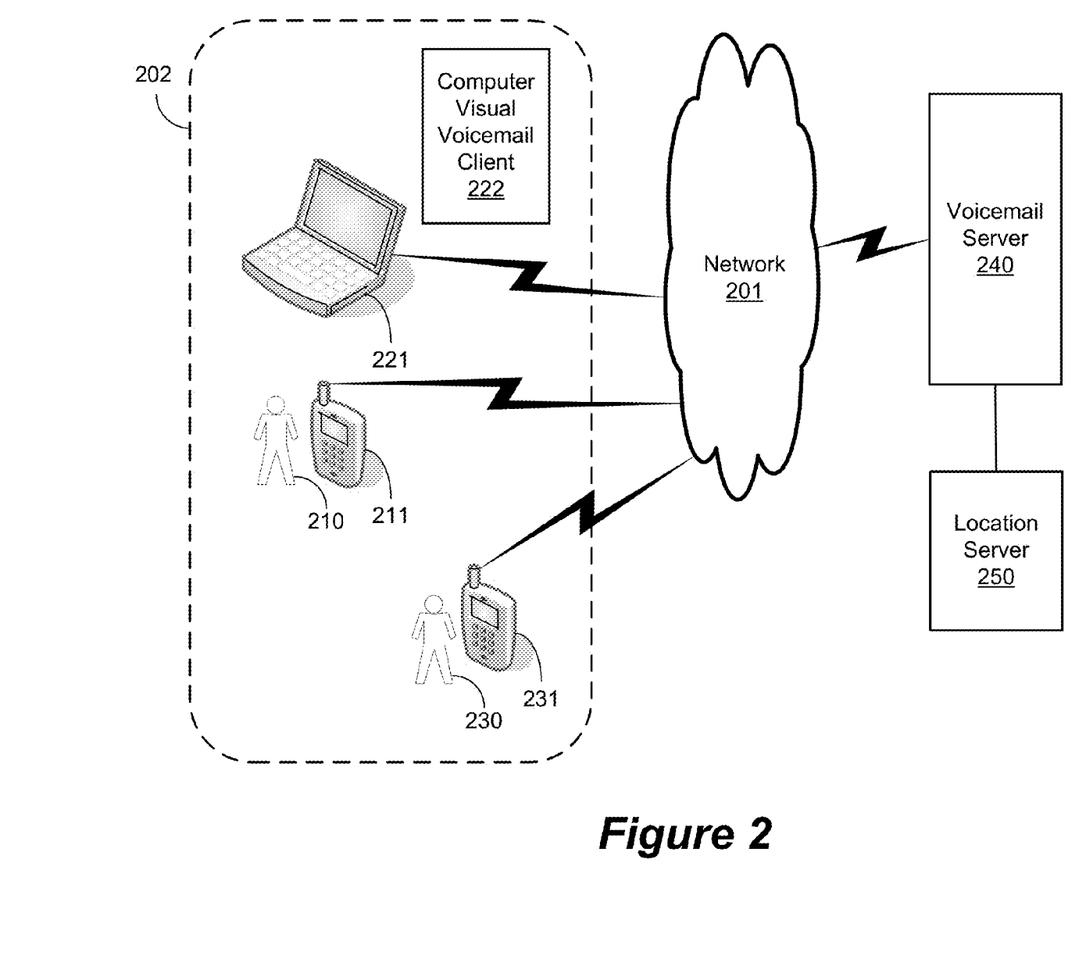
FIG. 2 illustrates another non-limiting exemplary network environment in which visual voicemail privacy protection methods and systems may be implemented.

In other embodiments, the activation or enablement of privacy controls may be based on the location of an authorized user. Referring now to FIG. 2, user 210 may be operating or merely carrying wireless device 211. Likewise, user 230 may be operating or merely carrying wireless device 231. Devices 211 and 231 may be any type of communications device as described herein, and may communicate with network 201, which like network 101 of FIG. 1, represents any number and combination of any types of interconnected networks. Computer 221 represents any device that may be configured to access voicemail data, and in some embodiments such access may be obtained using computer visual voicemail client 222. Computer visual voicemail client 222 may be any software, hardware, or combination thereof configured to interact with voicemail server 240 as described herein. Voicemail server 240 may be any device configured to manage, process, store, obtain, or otherwise provide voicemail data to end user devices. Voicemail server 240 may be communicatively connected to location server 250, which may be any device configured to manage, process, store, obtain, or otherwise provide location information for a user device to other devices, such as voicemail server 240.

In one embodiment, user 210 may wish to access his or her voicemail using a visual voicemail client, and thus may operate computer 221 to interact with computer visual voicemail client 222. In one embodiment, voicemail server 240 may be configured to request credentials using any means described herein if a user requesting access to voicemail data is not within a defined secure area. In such an embodiment, voicemail server 240 may be configured with area or location data associated with one or more particular devices that may be used for voicemail data access. For example, in FIG. 2, voicemail server 240 may be configured with security area 202, and may be configured to associate security area 202 with computer 221 and user 210. Thus, when user 210 operates computer 221 and activates computer visual voicemail client 222, upon detection of computer visual voicemail client 222 activation voicemail server 240 may transmit a request for location information for user 210, or more specifically, for wireless device 211 that is associated with user 210, to location server 250. Location server 250 may reply with location information in any useful form, including longitude and latitude, GPS coordinates, etc. Voicemail server 240 may then determine if user 210 or wireless device 211 is within security area 202. Alternatively, in embodiments where location server 150 is configured with security area data, voicemail server 240 may simply query location server 250 as to whether user 210 or wireless device 220 is within security area 202.

If user 210 or wireless device 211 is in security area 202, voicemail server 240 may be configured to not require user credentials before allowing user 210 access to voicemail data.

Likewise, if voicemail server 240 determines that wireless device 211 or user 210 is not in security area 202 when the activation of computer visual voicemail client 222 is detected, then voicemail server 240 may require proper credentials from user 210 and/or computer visual voicemail client 222 before providing voicemail data to computer visual voicemail client 222.

In some embodiments, the privacy protections employed may change dynamically. For instance, if user 210 were to exit security area 202 after providing credentials to voicemail server 240, voicemail server 240 may be informed of the change of location of user 210, for instance by periodically querying location server 250 or where location server 250 is configured to automatically update voicemail server 240 with user location changes. In response to such a location change, voicemail server 240 may then require credentials before providing any further voicemail data. Fail safe measures may also be configured on voicemail server 240. For example, voicemail server 240 may be configured to not allow the disabling of privacy protection features on more than one device at a time, thus preventing the mistaken disabling of privacy protection features on two or more devices at once due to errors in location data.

Alternatively, a user device may enable or disable privacy protection features based on a locally detected location of a user. Such location detection may be performed through the use of near field communications methods, such as Bluetooth™. For example, computer 221 may detect a near field communications signal of wireless device 211 and, responsive to detecting the signal, may disable the privacy protections configured for computer visual voicemail client 222 or transmit a signal to voicemail server 240 that a device associated with user 210 is near computer 221, to which voicemail server 240 may respond by disabling privacy protection features. Computer 221 may also, or instead, detect the absence of a previously detected near field communications signal, for example if user 210 leaves security area 202, and may then re-enable privacy protection features or communicate to voicemail server 240 that a device associated with user 210 is no longer proximate to computer 221.

In other embodiments, the activation or enablement of privacy controls may be based on the detected location of an unauthorized user. For example, user 210 may be within security area 202, and therefore privacy protection features of computer visual voicemail client 222 may have been disabled. User 230 may enter security area 202 with wireless device 231. Location server 250 may determine that wireless device 231 is within security area 202 and communicate that information to voicemail server 240. Alternatively, voicemail server 240 may periodically query location server 250 for information on any devices within security area 202, and may receive a response that wireless device 231 is now within security area 202. In yet another alternative, voicemail server 240 may obtain information about the location of wireless device 231 and determine that wireless device 231 is within security area 202. Any means and methods of determining device locations and whether such devices are within a particular area are contemplated as within the scope of the present disclosure. Responsive to detecting that wireless device 231 is in security area 202, and upon determining that wireless device 231 is not associated with an authorized user, voicemail server 240 may enable privacy protection features of computer visual voicemail client 222.

Alternatively, computer visual voicemail client 222 may enable or disable privacy protection features based on a locally detected location of an unauthorized user. Such location detection may be performed through the use of near field communications methods, such as Bluetooth™. For example, computer 221 may detect a near field communications signal of wireless device 231 and, responsive to detecting the signal, may enable the privacy protections configured for computer visual voicemail client 222 or transmit a signal to voicemail server 240 that a device that is not associated with an authorized user is near computer 221, to which voicemail server 240 may respond by enabling privacy protection features.

Note that authorized and unauthorized devices may be user or system specified and may be adjustable. For example, a user may interact with a voicemail system to identify certain devices that, when detected near a device that can allow voicemail data access, should trigger a voicemail server or client to disable privacy protection features. Similarly, a user may identify devices that, when detected in the vicinity of a device that can allow voicemail data access, should trigger a voicemail server or client to enable privacy protection features. Alternatively, such specified device may configured by the provider of voicemail services. Any methods and means of specifying which devices trigger enablement and/or disablement of features in a voicemail system are contemplated as within the scope of the present disclosure.

Figure 3:
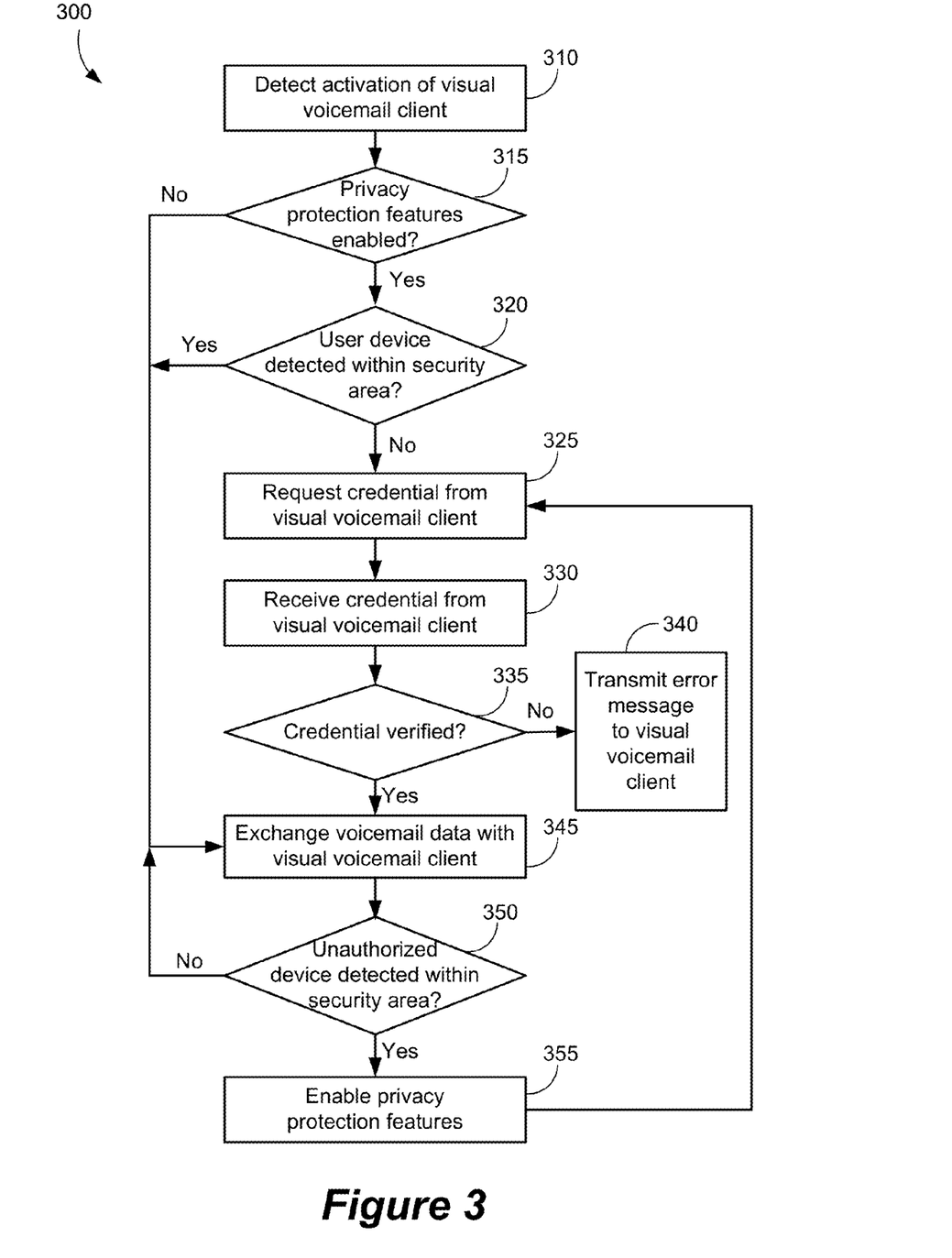
FIG. 3 illustrates a non-limiting exemplary method of implementing visual voicemail privacy protection.

FIG. 3 illustrates exemplary, non-limiting method 300 of implementing the disclosed subject matter. Note that one or more of the actions performed in method 300 may be performed without performing the other actions disclosed, and any combination of the actions disclosed in method 300 may be performed in any order. The actions of method 300 may be performed by one or more devices operating separately or in combination.

In one embodiment, a device, such as a voicemail server, may detect the activation of a visual voicemail client at block 310. This may be due to a visual voicemail client requesting a communications session with the voicemail server, or due to detecting any other interaction with a voicemail client. Alternatively, a visual voicemail client may be activated on a user device at block 310 and may not yet have initiated or performed any actions to contact a voicemail server. In one embodiment, activation of a visual voicemail client may be accessing a web page associated with a visual voicemail system.

At block 315 a determination is made as to whether privacy protection features are enabled. This determination may be performed by determining the privacy protection settings of a visual voicemail client and/or a voicemail server. Such settings may be associated with a particular user or account, and may be user configurable. If no privacy protection settings are enabled, at block 345 voicemail data is exchanged between a voicemail server and a visual voicemail client.

If privacy protection features are enabled on a voicemail server or a visual voicemail client, at block 320 a determination may be made as to whether an authorized user device is within a security area. For example, as described herein, a voicemail server may determine that a wireless device is in a defined security area in which the device running a visual voicemail client currently attempting to access voicemail data is located. In determining the outcome of block 320, a location server may be used to obtain location information. If an authorized device is within a defined security area, and if the voicemail server and/or the visual voicemail client is configured to disable privacy protection features when an authorized device is within the security area, then at voicemail data may be exchanged at block 345.

If no authorized device is within a defined security area and privacy protection features are enabled, at block 325 a voicemail server may request a credential from a visual voicemail client. Alternatively, block 325 may be performed by a visual voicemail client that requests a credential from a user or located a credential locally or remotely. The credential requested may be a user name and password combination, a single password, a digital certificate, one or more digital keys, or any other means of verifying or authenticating a user or device. The request may generate a user interface for supplying the credential or may trigger a voicemail client to locate or otherwise obtain the credential.

At block 330, a credential may be received at a voicemail server from a visual voicemail client. Alternatively, a credential may be located or obtained by a visual voicemail client or received from a user.

At block 335, a determination is made as to whether the credential obtained or received at block 330 has been successfully verified or authenticated. The verification or authentication of the credential may be performed using any effective means, and may be performed on any device, including a user device, a voicemail server, and a device dedicated to verifying or authenticating credentials. If the credential does not properly verify or authenticate, at block 340 an error message may be transmitted from a voicemail server to a visual voicemail client. Alternatively, where verification or authentication is performed on a user device, an error message may be generated on that device. In either situation, an error message may be presented to a user.

If the credential properly verifies or authenticates, at block 345 voicemail data may be exchanged between a voicemail server and a visual voicemail client. This may include any voicemail interactions and data transfers, and may continue until a communications session between a voicemail server and a visual voicemail client is terminated, times out, or otherwise ended.

Alternatively, the exchange of voicemail data may occur until an unauthorized device is detected. At block 350, a determination may be made as to whether an unauthorized device is in a security area associated with the device being used to access voicemail data. This may be performed by either the voicemail server or a device running a visual voicemail client. In either case the assistance of a location server may be employed. Alternatively, a user device may use near field communications to detect the presence of a device and generate an inquiry as to whether the detected device is authorized. If no unauthorized device enters a defined security area, data exchange continues at block 345.

If an unauthorized device is detected, at block 355 privacy protection features may be enabled, and at block 325 credentials may be requested from a user or device. For example, if a user is operating a visual voicemail client on an authorized device, and an unauthorized device enters an area proximate to the authorized device, the user may then be prompted for a user name and password in order to ensure that only an authorized user is accessing voicemail data. Alternatively, a visual voicemail client or a voicemail server may be configured to only request credentials if an unauthorized device is present in an area proximate to a user device upon activation of a visual voicemail client. Any other combination or configuration of privacy protection feature enablement may be implemented, and all such embodiments may be user-configurable.

The methods and systems described above assist protecting the privacy of users of visual voicemail systems. By implementing the present disclosure, the user experience is improved due to the increase in security. Set forth below are exemplary systems, devices, and components in which aspects of the present disclosure may be implemented.

Figure 4:
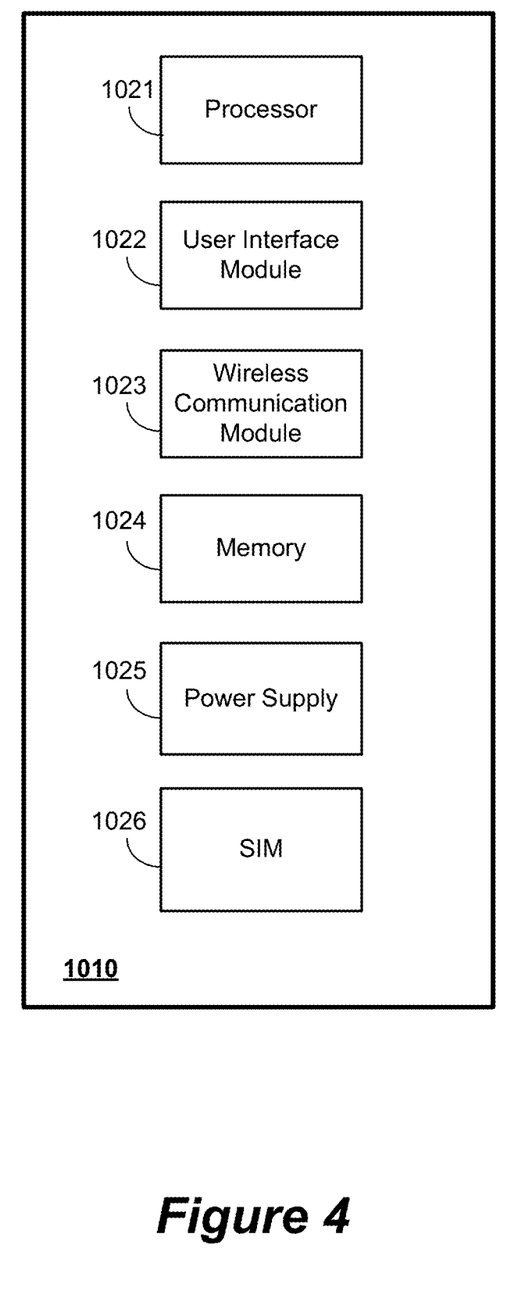
FIG. 4 is a block diagram of a non-limiting, exemplary wireless device that may be used in connection with visual voicemail privacy protection methods and systems.

FIG. 4 illustrates an example wireless device 1010 that may be used in connection with an embodiment. References will also be made to other figures of the present disclosure as appropriate. For example, wireless devices 111, 211, and 231 may each be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to systems and methods for visual voicemail privacy protection, for example. User interface module 1022 may be any type or combination of hardware and/or software that enables a user to operate and interact with wireless device 1010, and, in one embodiment, to interact with a system or software enabling the user to place, request, and/or receive calls, voicemail, voicemail notifications, voicemail content and/or data, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, networks 101 and 201, and voicemail servers 140 and 240, or any other type of wireless communications network or network equipment. Memory 1024 enables wireless device 1010 to store information, such as voicemail notifications, visual voicemail client software, visual voicemail data and/or content, multimedia content, software to interact with voicemail systems and network devices, and voicemail preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
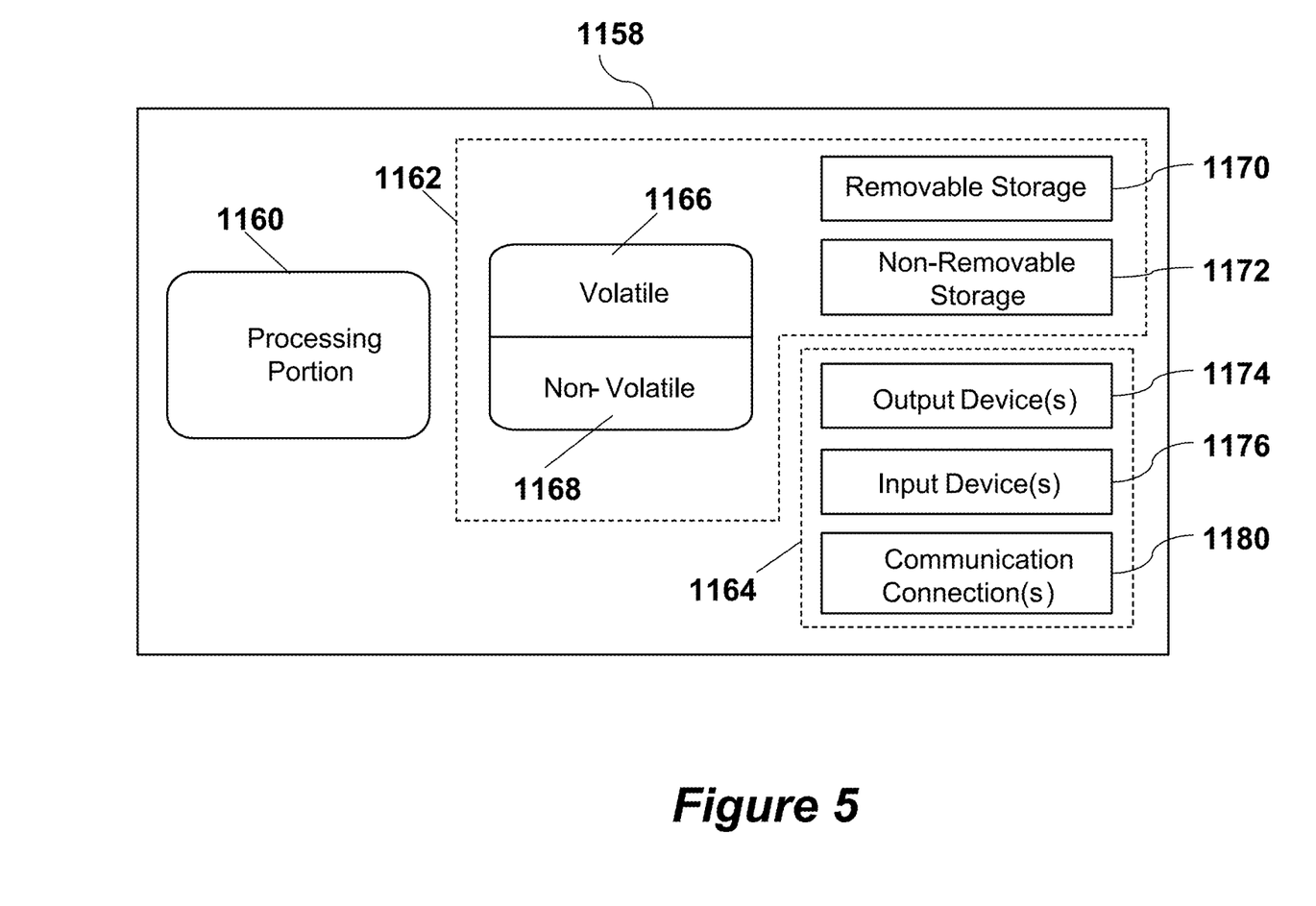
FIG. 5 is a block diagram of a non-limiting, exemplary processor in which visual voicemail privacy protection methods and systems may be implemented.

FIG. 5 is a block diagram of an example processor 1158 which may be employed in any of the embodiments described herein, including as one or more components of wireless devices 111, 211, and 231, voicemail servers 140 and 240, as one or more components of network equipment or related equipment, such as any component shown in FIGS. 1 and 2, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, establish and terminate visual voicemail data communications, transmit and receive voicemail notifications, credentials, and requests for credentials, transmit, receive, store and process voicemail data and/or content, execute software to interact with voicemail systems, receive and store voicemail preferences and configurations, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing voicemail, voicemail data and/or content, calls, other telephonic communications, etc. For example, the memory portion is capable of storing voicemail preferences, visual voicemail applications, voicemail credentials, and/or software capable of processing call requests, operating a visual voicemail client, receiving calls, processing voicemail and multimedia content, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network equipment as illustrated in FIGS. 1 and 2. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The networks illustrated in FIGS. 1 and 2 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how systems and methods for visual voicemail privacy protection may be implemented with stationary and non-stationary network structures and architectures in order to provide visual voicemail privacy protection. It can be appreciated, however, that systems and methods for visual voicemail privacy protection such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for visual voicemail privacy protection can be applied independently of the method of data transport, and do not depend on any particular network architecture, or underlying protocols.

Figure 6:
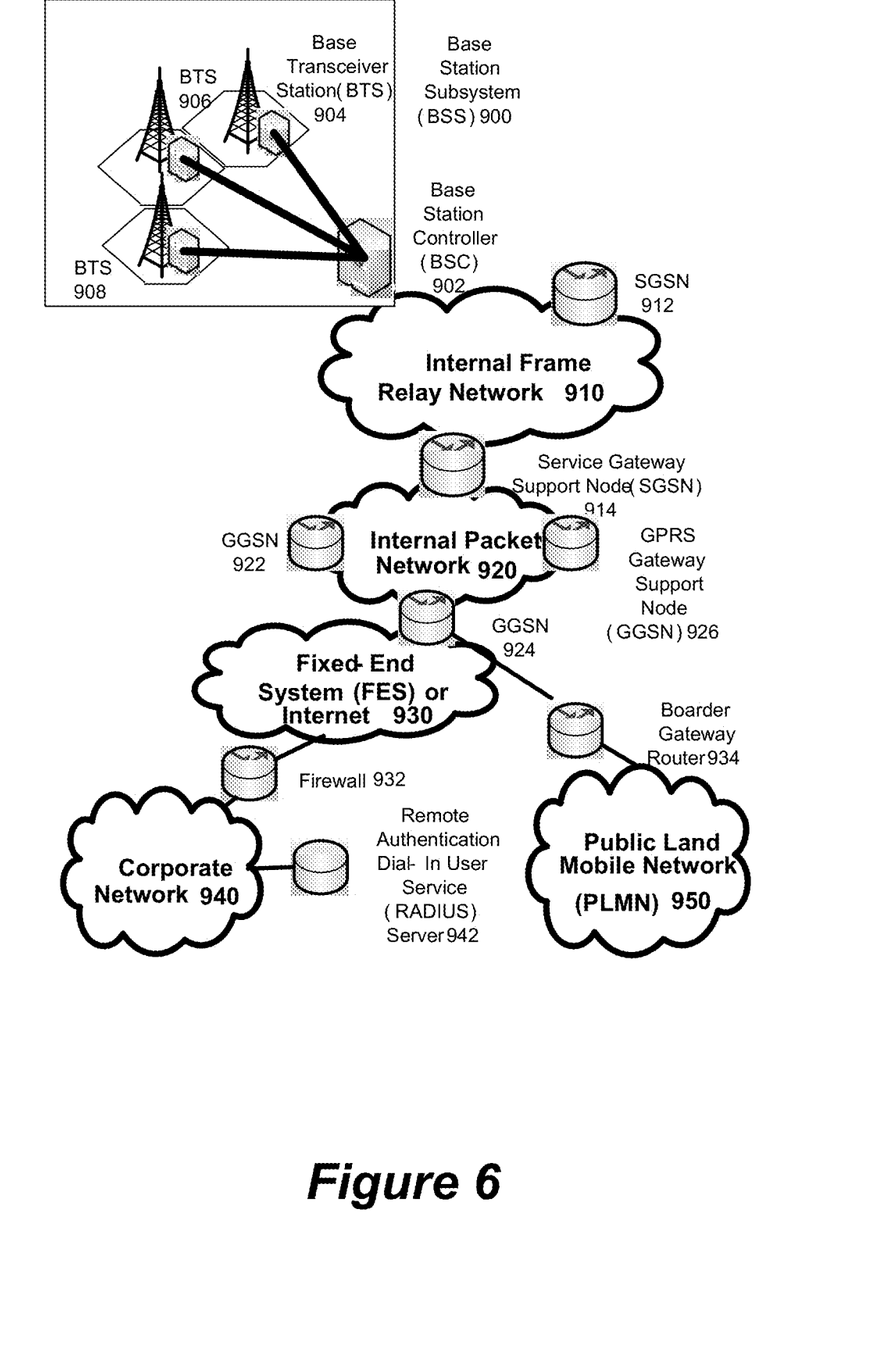
FIG. 6 is a block diagram of an exemplary packet-based mobile cellular network environment, such as a GPRS network, in which visual voicemail privacy protection methods and systems may be implemented.

FIG. 6 depicts an overall block diagram of an exemplary packet-based mobile cellular network environment, such as a GPRS network, in which the systems and methods for visual voicemail privacy protection such as those described herein can be practiced. In an example configuration, networks 101 and 201 as illustrated in FIGS. 1 and 2 may be encompassed by or interact with the network environment depicted in FIG. 6. Similarly, wireless devices 111, 211, and 231 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 111, 211, and 231) become connected to the wireless network. In exemplary fashion, the packet traffic originating from user devices (e.g., wireless devices 111, 211, and 231) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
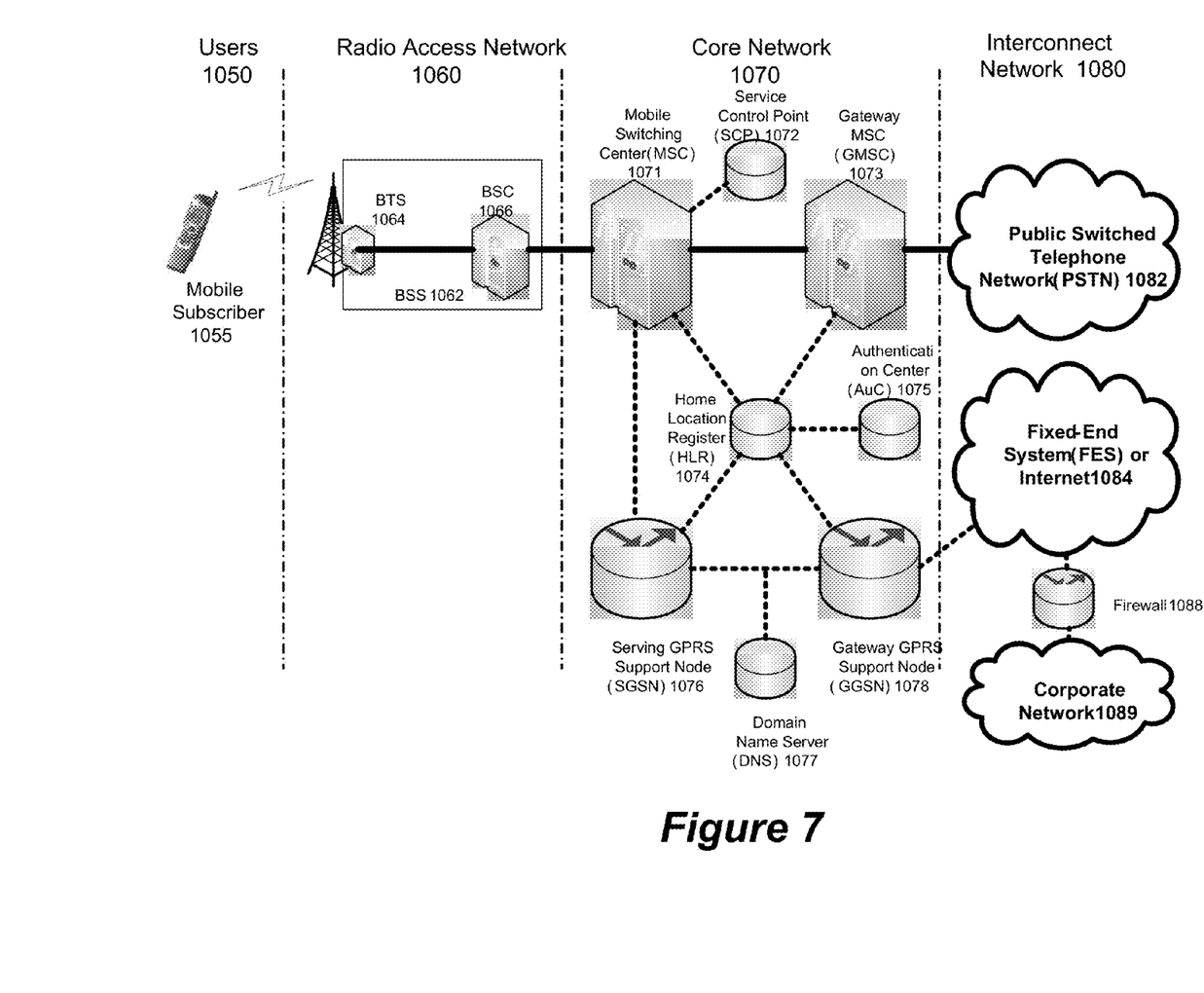
FIG. 7 illustrates a non-limiting, exemplary architecture of a typical GPRS network, segmented into four groups, in which visual voicemail privacy protection methods and systems may be implemented.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise any of wireless devices 111, 211, and 231. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 111, 211, and 231, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of systems and methods for visual voicemail privacy protection such as those described herein can include but are not limited to Gateway GPRS Support Node tables, Fixed End System router tables, firewall systems, VPN tunnels, and any number of other network elements as required by the particular digital network.

Figure 8:
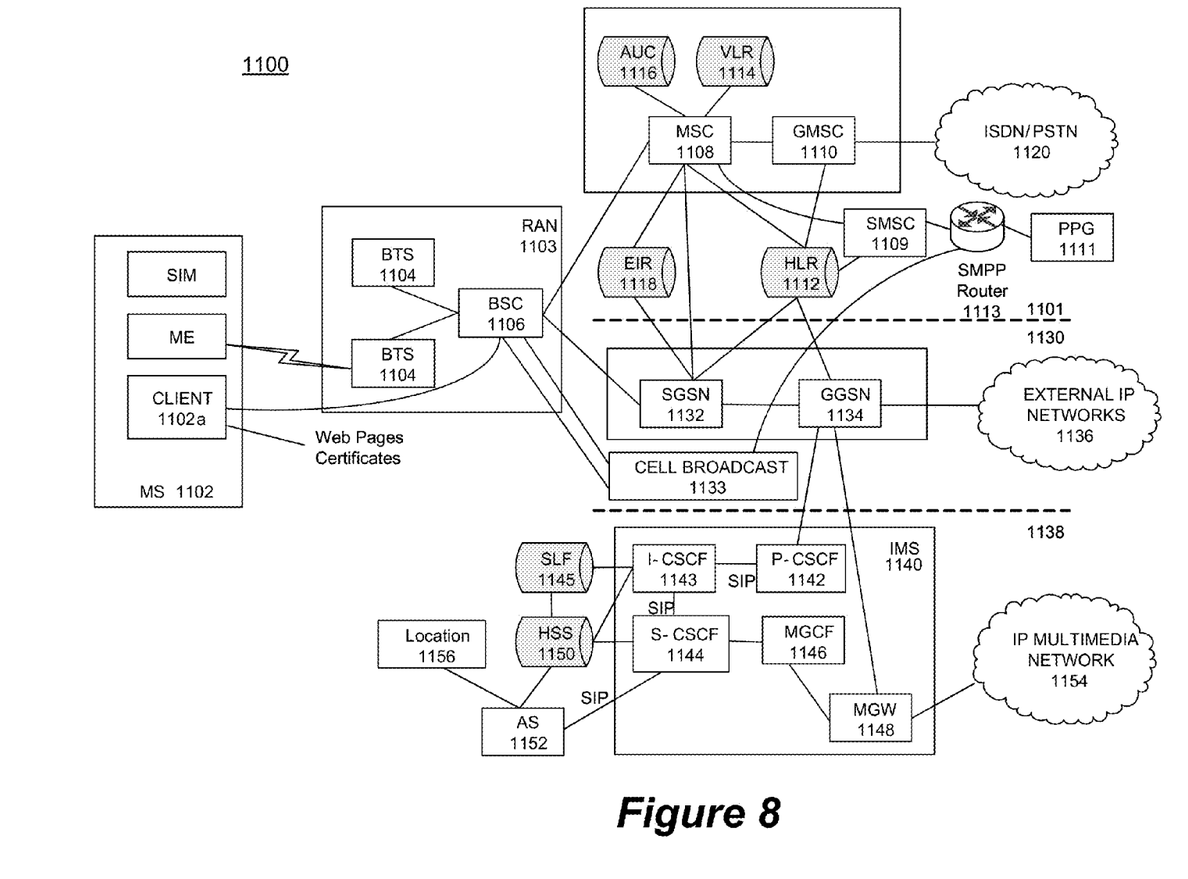
FIG. 8 illustrates a non-limiting alternate block diagram of an exemplary GSM/GPRS/IP multimedia network architecture in which visual voicemail privacy protection methods and systems may be implemented.

FIG. 8 illustrates another exemplary block diagram view of a GSM/GPRS/IP multimedia network architecture 1100 in which the systems and methods for visual voicemail privacy protection such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 111, 211, and 231) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as the Internet, or to any other external network, such as an X.25 network. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for visual voicemail privacy protection have been described in connection with various communications devices and computing devices/processors, the underlying concepts can be applied to any communications or computing device, processor, or system capable of implementing the visual voicemail privacy protection systems and methods described. The various techniques described herein can be implemented in connection with hardware or software or, where appropriate, with a combination of both. Thus, the methods and apparatuses for visual voicemail privacy protection, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for visual voicemail privacy protection. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for visual voicemail privacy protection can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus visual voicemail privacy protection. When implemented on a general-purpose processor, the program code combines with the processor to provide a unique apparatus that operates to invoke the functionality of visual voicemail privacy protection as described herein. Additionally, any storage techniques used in connection with a visual voicemail system can invariably be a combination of hardware and software.

While systems and methods for visual voicemail privacy protection have been described in connection with the various embodiments of the various figures, it is to be understood that other similar embodiments can be used or modifications and additions can be made to the described embodiments for performing the same function of providing visual voicemail privacy protection without deviating therefrom. For example, one skilled in the art will recognize that visual voicemail privacy protection systems and methods as described in the present application may apply to any environment, whether wired or wireless, and may be applied to any number of such devices connected via a communications network and interacting across the network. Therefore, visual voicemail privacy protection should not be limited to any single embodiment, but rather should be construed in breadth and scope in accordance with the appended claims.

What is claimed is:

1. A method comprising:
    detecting at a voicemail server an activation of a visual voicemail client;
    determining at the voicemail server that at least one privacy protection feature is enabled;
    determining at the voicemail server that a first device associated with a voicemail account is within a defined security area associated with a user device executing the visual voicemail client;
    disabling at the voicemail server the at least one privacy protection feature responsive to determining that the first device is within the defined security area;
    transmitting voicemail data from the voicemail server to the visual voicemail client while the at least one privacy protection feature is disabled;
    determining at the voicemail server that a second device not associated with the voicemail account has entered the defined security area; and
    responsive to determining that the second device not associated with the voicemail account has entered the defined security area, enabling at the voicemail server the at least one privacy protection feature.

2. The method of claim 1, wherein determining that the first device associated with the voicemail account is in the defined security area comprises receiving an indication from the user device that the user device has detected a near field communications signal transmitted by the first device.

3. The method of claim 1, wherein determining that the first device associated with the voicemail account is within the defined security area comprises transmitting a request for a current location of the first device to the first device.

4. The method of claim 1, wherein determining that the first device associated with the voicemail account is within the defined security area comprises transmitting a request for a current location of the first device to a location server.

5. The method of claim 1, wherein determining that the second device not associated with the voicemail account has entered the defined security area comprises receiving an indication from the user device that the user device has detected a near field communications signal transmitted by the second device.

6. The method of claim 1, wherein the at least one privacy protection feature comprises a requirement for a credential.

7. The method of claim 6, wherein the credential comprises at least one of a user name, a password, a key, a certificate, or a combination of the user name and the password.

8. A system comprising:
    a memory comprising instructions; and
    a processor coupled to the memory, wherein the processor, when executing the instructions, effectuates operations comprising:
        detecting an activation of a visual voicemail client;
        determining that at least one privacy protection feature is enabled;
        determining that a first device associated with a voicemail account is within a defined security area associated with a user device executing the visual voicemail client;
        disabling the at least one privacy protection feature responsive to determining that the first device is within the defined security area;
        transmitting voicemail data to the visual voicemail client while the at least one privacy protection feature is disabled;
        determining that a second device not associated with the voicemail account has entered the defined security area; and
        responsive to determining that the second device not associated with the voicemail account has entered the defined security area, enabling the at least one privacy protection feature.

9. The system of claim 8, wherein the operation of determining that the first device associated with the voicemail account is in the defined security area comprises receiving an indication from the user device that the user device has detected a near field communications signal transmitted by the first device.

10. The system of claim 8, wherein the operation of determining that the first device associated with the voicemail account is within the defined security area comprises transmitting a request for a current location of the first device to the first device.

11. The system of claim 8, wherein the operation of determining that the first device associated with the voicemail account is within the defined security area comprises transmitting a request for a current location of the first device to a location server.

12. The system of claim 8, wherein the operation of determining that the second device not associated with the voicemail account has entered the defined security area comprises receiving an indication from the user device that the user device has detected a near field communications signal transmitted by the second device.

13. The system of claim 8, wherein the at least one privacy protection feature comprises a requirement for a credential.

14. The system of claim 13, wherein the credential comprises at least one of a user name, a password, a key, a certificate, or a combination of the user name and the password.

15. A non-transitory computer-readable storage medium comprising computer-executable instructions, which when executed by a processor, cause the processor to effectuate operations comprising:
    detecting an activation of a visual voicemail client;
    determining that at least one privacy protection feature is enabled;
    determining that a first device associated with a voicemail account is within a defined security area associated with a user device executing the visual voicemail client;
    disabling the at least one privacy protection feature responsive to determining that the first device is within the defined security area;
    transmitting voicemail data to the visual voicemail client while the at least one privacy protection feature is disabled;
    determining that a second device not associated with the voicemail account has entered the defined security area; and responsive to determining that the second device not associated with the voicemail account has entered the defined security area, enabling the at least one privacy protection feature.

16. The non-transitory computer-readable storage medium of claim 15, wherein the operation of determining that the first device associated with the voicemail account is in the defined security area comprises receiving an indication from the user device that the user device has detected a near field communications signal transmitted by the first device.

17. The non-transitory computer-readable storage medium of claim 15, wherein the operation of determining that the first device associated with the voicemail account is within the defined security area comprises transmitting a request for a current location of the first device to the first device.

18. The non-transitory computer-readable storage medium of claim 15, wherein the operation of determining that the first device associated with the voicemail account is within the defined security area comprises transmitting a request for a current location of the first device to a location server.

19. The non-transitory computer-readable storage medium of claim 15, wherein the operation of determining that the second device not associated with the voicemail account has entered the defined security area comprises receiving an indication from the user device that the user device has detected a near field communications signal transmitted by the second device.

20. The non-transitory computer-readable storage medium of claim 15, wherein the at least one privacy protection feature comprises a requirement for a credential.

* * * * *